Jan. 19, 1943.    R. F. WILSON ET AL    2,308,955
INNER TUBE
Filed March 23, 1940
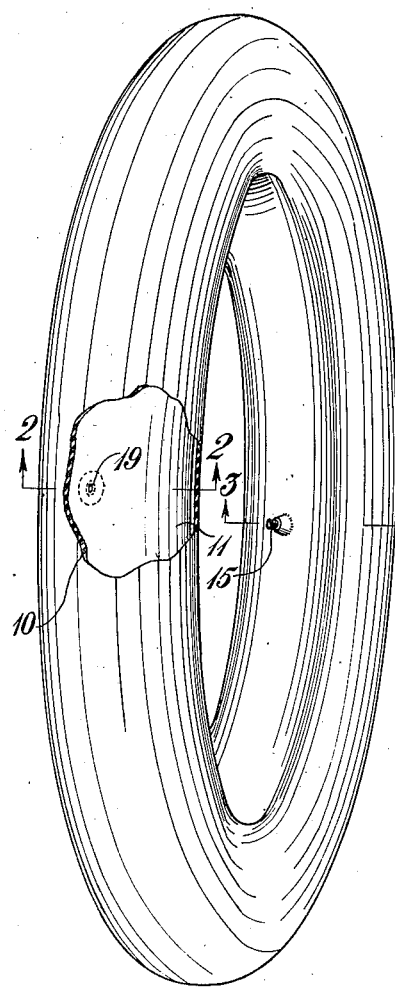
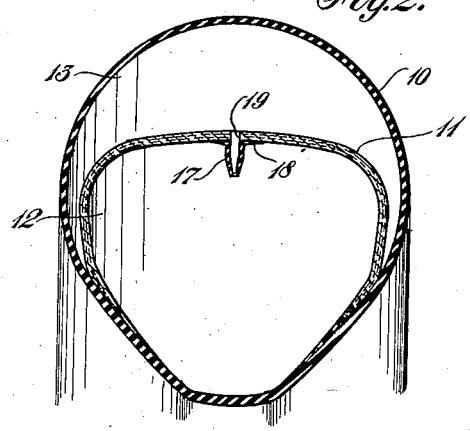
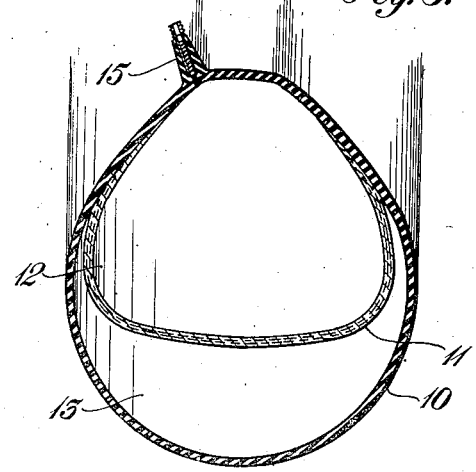
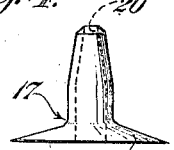
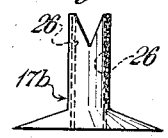
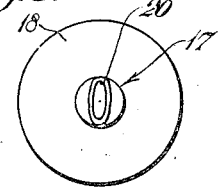
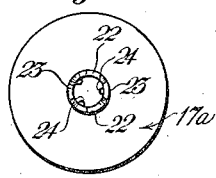
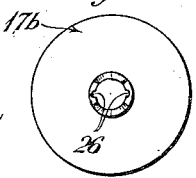
INVENTOR
Robert F. Wilson
AND
John W. Liska
BY
ATTORNEYS Patented Jan. 19, 1943

2,308,955

UNITED STATES PATENT OFFICE 2,308,955

INNER TUBE

Robert F. Wilson and John W. Liska, Akron, Ohio, assignors to The Firestone Tire & Rubber Company, Akron, Ohio, a corporation of Ohio Application March 23, 1940, Serial No. 325,568

1 Claim. (Cl. 152—430)

This invention relates to fluid pressure retaining devices of the general character of devices commonly known as inner tubes for pneumatic tires of motor vehicles, and more especially it relates to safety inner tubes of the type that consist of two concentric air chambers, one within the other, wherein the inner chamber is designed temporarily to support the load upon sudden deflation of the outer chamber, as from blowout or puncture, for an interval of sufficient duration to enable the driver to bring the vehicle to a stop. Although the invention is specifically described and illustrated as a separate inner tube, it is to be understood that it is also adapted to pneumatic tires where the fluid pressure chamber or chambers are integral with the casing.

The chief objects of the invention are to provide safety and convenience of motor vehicle operation. More specifically, the invention aims to provide an improved safety inner tube of the character mentioned that provides slow but positive leakage of the inner chamber in case of a blowout; which enables both chambers concurrently to be inflated to equal pressure; and which requires no greater time for inflation than is required for the ordinary single chamber inner tubes. Another object is to provide an improved device of the type referred to above wherein there are two chambers, one reserve chamber within the other, with a passage between the two for normal inflation and deflation during mounting and demounting of the tire, said passage being provided with a valve for reducing the permissible flow of fluid from the reserve chamber in the event the fluid pressure in the outer chamber is suddenly released, as in the case of a blowout.

A more specific object is to provide an improved device of the type referred to having a main chamber and a reservoir chamber, with a diaphragm separating the two, a fluid passage in said diaphragm for normal inflation and deflation, and a tubular rubber valve having sidewalls adapted to collapse in response to the resultant differential pressure conditions in the event the outer or main chamber is ruptured, temporarily to retain fluid pressure in the reservoir chamber. Other objects will be manifest as the specification proceeds.

Of the accompanying drawing:

Figure 1 is a perspective view of an inner tube embodying the invention, a part thereof being broken away to reveal underlying structure;

Figure 2 is a section, on a larger scale, on the line 2—2 of Figure 1;

Figure 3 is a section, on a larger scale, on the line 3—3 of Figure 1;

Figure 4 is an elevation view, on a larger scale, of a valve that enables the passage of air from the inner chamber of the tube to the outer chamber;

Figure 5 is a plan view of the valve shown in Figure 4;

Figure 6 is an elevational view of a modified form of valve adapted to be disposed in the wall between the inner and outer chambers;

Figure 7 is a plan view of Figure 6;

Figure 8 is an elevational view of a further modified form of the valve; and

Figure 9 is a plan view of Figure 8.

Referring to the drawing, there is shown therein an inner tube of the type that consists of an annular, tubular, distensible body, the interior of which is divided by a partition or diaphragm that is transversely disposed and which extends circumferentially thereof, said diaphragm being attached to the respective side walls of the body, and including a valve of novel design for enabling air to pass from one side of the diaphragm to the other.

As is most clearly shown in Figures 2 and 3, the annular, tubular body 10 of the tube consists of elastic rubber composition, and the transverse diaphragm 11 therein consists of inextensible, impervious material, such as rubberized fabric, two plies of the latter being shown. The arrangement is such that the diaphragm 11 divides the interior of the tube into two concentric compartments or chambers, of which the inner chamber is designated 12 and the outer chamber is designated 13. The marginal portions of the diaphragm 11 are integrally united to the body structure 10 by vulcanization, the union being in the regions of the tube that are adjacent or abut the respective bead portions of a pneumatic tire casing, when the inflated tube is mounted therein. The edges of the diaphragm are spaced apart from each other so that the inner circumferential region of the body 10 is not reinforced thereby, wherefore it retains its normal elastic characteristic which enables it readily to be deformed into conformity with a tire rim upon which it is mounted during use. The inner tube is provided with the usual valve stem 15, which stem opens into the inner chamber 12 of the tube.

Communication between the inner chamber 12 and the outer chamber 13 is effected through the agency of a valve 17. In the embodiment shown in Figures 4 and 5, the valve 17 is a flexible, tubular structure of rubber, or the like, that is formed with a base flange 18 by which it is attached to the diaphragm 11, by adhesion or vulcanization, the axial opening of the valve being in registry with an aperture or port 19 in said diaphragm, which port is located in the medial plane of the diaphragm, midway between the lateral margins thereof. The tubular valve 17 is arranged in the inner chamber so that in the event the pressure is released in the outer chamber the pressure in the inner chamber will collapse the tubular structure to control the flow of the fluid pressure from the inner to the outer chamber. Preferably the valve and port are located substantially on the diametrically opposite side of the tube from the valve stem 15. Adjacent the base flange 18, the valve may be circular in cross-section, but toward its end remote from the flange it is flattened or tapered on opposite sides so that the orifice 20 in the end thereof is of elliptical shape, as shown in Figure 5. The effective cross sectional area of the orifice 20 is, however, as large as the air passage in the inflation stem 15. The elliptical shape of the outer end of the valve insures that the latter will always close to the same extent and in the same manner to thereby give a more definite control of the deflation of the inner chamber in the event of a blowout.

The inner tube is mounted within a pneumatic tire casing in the usual manner. During inflation of the tube, the incoming air passes first into the inner chamber 12 and then through the valve 17 into the outer chamber 13, the orifice of said valve remaining fully open because of the substantially equal fluid pressure in the inner and outer chambers. Since the effective cross sectional area of the orifice 20 is at least as great as the effective cross sectional area of the inflation valve 15, there is no substantial difference in pressure between the two chambers and therefore the valve 17 does not close during inflation. Thus when the two chambers of the tube are concurrently inflated, the pressures in the chambers being substantially equal during the entire inflating interval, there is no waste of time such as occurs when the air is required to pass through minute apertures in the diaphragm; the inflation being accomplished in no greater time than that required for inflating a single-chamber tube. Furthermore, during inflation the pressure at the inflation valve 15 is the same as the pressure in the outer chamber and there is no possibility of inflation being discontinued before the outer chamber is sufficiently inflated, with resulting under-inflation of the tube when the pressures in the two chambers subsequently become equalized.

When the tire is in inflated condition and a blowout occurs, it is the elastic wall 10 of the tube that ruptures, thus causing rapid evacuation of the air in outer chamber 13 and establishing a substantial pressure differential between the chambers 12 and 13. This differential of pressures causes the collapse of the flattened end portion of valve 17 such as substantially to close the orifice 20, thus preventing the rapid evacuation of inner chamber 12. Due to the inherent stiffness of the material of the valve, the ends of the elliptical orifice 20 do not completely collapse, which feature may be relied upon to restrict the maximum rate of deflation of the inner chamber. The time required to evacuate the inner chamber 12 may preferably be anywhere from one to six minutes. It should be long enough to enable the driver to bring his vehicle to a stop, or to bring it under control, but not long enough to tempt him to continue to run since this would result in serious damage to tire and tube.

In Figures 6 and 7, a modified form of the valve designated at 17a is shown. In this embodiment, the main body 21 is a hollow cylinder of annular cross section from the base 18 to the free end thereof, which latter end is provided with two notches 22 at diametrically opposite sides thereof. The notches separate the free end of the valve into upstanding flaps or lips 23, 23, which will readily collapse or come together when a small pressure differential exists between the bore 25 and the outside of the valve body 21, with the higher pressure on the outside. This is the condition existing when the valve is attached to the diaphragm 11 of the tube and when the pressure in the outer chamber 13 is suddenly released, as more fully described in connection with embodiment of the invention shown in Figures 1 to 4.

For practical considerations, it is desirable that the flaps or lips do not close air tight, and to this end, three longitudinally extending internal ribs 24 are provided. These ribs may be proportioned to limit the closure of the flaps or lips 23 to the desired amount in order to control the time or rate of deflation of the inner chamber 12 of the tube. As in the other embodiments of the invention, the effective cross sectional area of the bore 25 of the valve in open condition is at least as great as the cross sectional area of the inflation valve 15, so that the air will pass into the outer chamber at substantially the same rate that it enters the inner chamber through valve 15.

A further modification is shown in Figures 8 and 9. This embodiment is similar in every respect to the modification shown in Figures 6 and 7, except small longitudinal grooves 26 are provided in the inner surface of the tubular valve 17b in place of the ribs 24 shown in the latter figures. These grooves may be so proportioned as to control the rate of deflation of the inner chamber in a manner similar to that described in connection with Figures 6 and 7.

The improved inner tube possesses all the advantages inherent in tubes of this character, and possesses other advantages, as hereinbefore set forth, not present in prior inner tubes of the same general type.

Modification may be resorted to without departing from the spirit of the invention, or the scope thereof as defined by the appended claim.

What is claimed is:

A valve adapted to be operably associated with an aperture in the wall between the chambers of a multiple chamber inner tube for tires, said valve comprising a rubber tubular structure having an integral flange at one end, the opposite end thereof having notches on diametrically opposed sides thereof providing a pair of opposed flaps, and means carried by at least one of said flaps to prevent complete contact between the confronting faces of said flaps.

ROBERT F. WILSON.
JOHN W. LISKA.